July 16, 1946.  E. KARFIOL ET AL  2,404,073
METHOD OF MAKING ORNAMENTAL ARTICLES
Filed Nov. 25, 1944
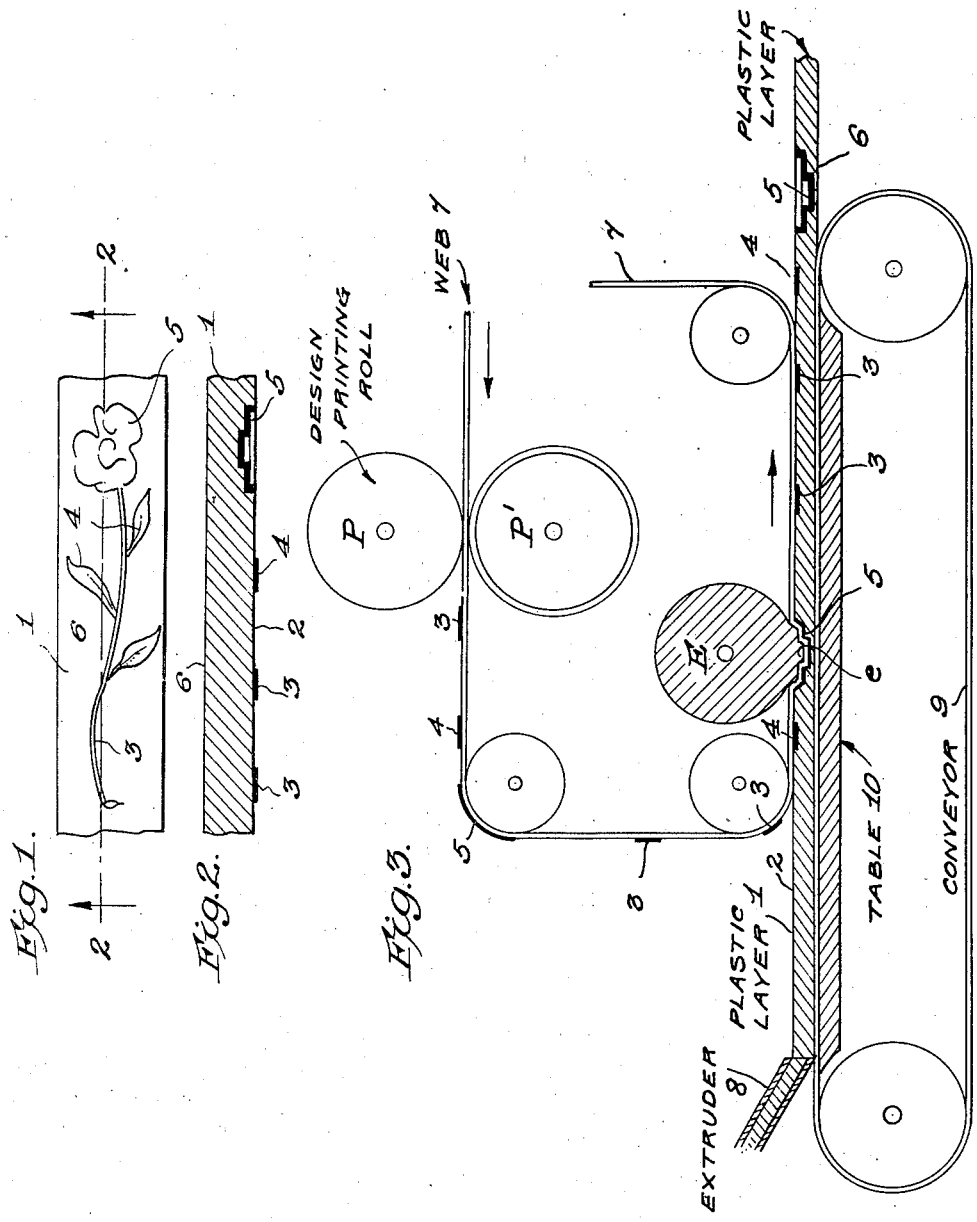
INVENTORS
EDWARD KARFIOL & WILLIAM A. ROEHM
BY
ATTORNEY Patented July 16, 1946

2,404,073

UNITED STATES PATENT OFFICE 2,404,073

METHOD OF MAKING ORNAMENTAL ARTICLES

Edward Karfiol, Great Neck, and William A. Roehm, Rockville Centre, N. Y., assignors to Royal Lace Paper Works, Brooklyn, N. Y., a corporation of New York Application November 25, 1944, Serial No. 565,156

4 Claims. (Cl. 41—33)

This invention is a method of making ornamented articles of a plastic nature, including shelf edgings and the like.

In the preferred form of practising the present invention, we print, in black or one or more colors, a predetermined design upon one surface of a transfer web of any appropriate material with an ink or other suitable printing material so constituted that it may be readily transferred from the web to a plastic surface. The web is then passed into contact with a layer of plastic and while in contact with such layer, the web is embossed into the contacting surface of the layer so as to form in the layer depressions in which at lease part of the printed design is positioned.

The printing ink or other material employed is such that it will thereupon adhere to the plastic layer and, after the said material has thus adhered, the web is then stripped from the plastic layer, leaving the printed design attached to one face of the plastic layer and in the depressions therein.

The opposite face of the plastic layer is preferably smooth and uninterrupted, and the plastic is transparent, so that the printed design, adhering to the back face thereof, may be readily seen therethrough. Those portions of such printed design as are positioned in depressions as stated, will optically appear in bas-relief and when viewed from the smooth front face of the plastic layer.

Any appropriate plastic may be employed for the plastic layer. For example, we may use thermoplastic or thermosetting materials and we may use heat when desirable and necessary to carry out the method of this invention, either to facilitate the impressing of either the whole or portions of the printed design into the back face of the plastic layer or for thereafter facilitating the setting of curing of such layer. Examples of plastics which may be conveniently used are as follows: cellulose acetate, cellulose acetate butyrate, polystyrene, ethyl cellulose, methocryolate, chloride, nylon, vinylidene and other vinyl resins.

In the accompanying drawing we have illustrated one specific way of practising the present invention, but the showing therein made is to be understood as illustrative only and not as defining the limits of the invention.

In said drawing:

Figure 1 is a face view of an article made according to this invention.

Figure 2 is a section on the line 2—2 of Figure 1.

Figure 3 diagrammatically illustrates a method embodying this invention.

The article shown in Figures 1 and 2 comprises a transparent plastic layer 1, on the back face 2 of which is printed a design illustrated as a rose sprig consisting of a stem 3 with leaves 4 and a bloom 5. Thickness is shown as greatly exaggerated in the drawing so that the presence of the printing material may be indicated. The entire printed design may be impressed into the back face 2 of the plastic layer 1, but, as shown, only the bloom 5 is thus impressed, the stem 3 and leaves 4 being surface printed on the face 2, as clearly appears in Figure 2. With this arrangement the stem and leaves will appear through the front face 6 of the layer 1 as flat printed while the bloom will appear in bas-relief with different parts thereof exhibiting varying effects of light and shadow according to the various degrees of relief of the respective parts thereof.

The method by which these results are accomplished is graphically illustrated in Figure 3. As there shown, a transfer web 7 is fed between appropriate printing rolls P, P', the former of which prints, on the upper surface of said web, the design in an appropriate ink or other printing material so constituted that it will readily transfer from the web, but will be retained on the web until removed therefrom by contact with the plastic to which it is to be applied.

From the printing rolls, the web travels into contact with a layer of plastic 1 which may conveniently be fed from an extruder 8 onto an endless conveyor 9 travelling across a table 10. After the web has been laid upon the plastic, it is acted upon by an embossing roll E having upon its surface raised portions e, adapted to register with that part of the printed design which it is desired to emboss into the plastic layer, being, in the illustrative showing, the bloom 5. This roll E forces the web 7 into firm contact with the surface 2 of the plastic layer and the projections e emboss the portions of the web, which carry the printed bloom, into the surface of the plastic layer.

The printing material and plastic have adherent properties one for the other, so that the printing material will adhere to and bond with the plastic. Consequently after the web and plastic layer leave the embossing roll E, the web may be stripped from the plastic layer, leaving the printed design on the face 2 of plastic layer and in the depressions or indentations formed by the projections e in the said face.

A wide variety of printing material may be employed according to this invention. We may conveniently use as such, a suitable dye dissolved in a solvent mixture of an adhesive resin which has an affinity for and is compatible with the plastic of the plastic layer to which it is to be transferred, but is not so completely compatible with the substance of the transfer web. For example, if the plastic layer is of cellulose acetate, we may use, as a printing material an alcohol or water-soluble dye dissolved in a solvent mixture of an adhesive resin such as polyvinyl acetate and for the transfer web we could, in this case, use a web of polystyrene. Or we could coat a transfer web of paper or other material with a solution of polystyrene or print or coat those portions of the web, on which the design is to be carried, with a solution of polystyrene, and then superimpose the polyvinyl acetate base printing material thereon. Pigmented printing materials may also be used, as well as a wide variety of the synthetic resin base printing materials in the carrying out of this invention.

After the design has been applied to the plastic layer and the web stripped, a coating of varnish or any other suitable protective material may be applied over the upper surface of the plastic layer to protect the printed design thereon.

The invention has been described as carried out in the form of a continuous process by the use of rolls, traveling webs and layers, but, as an alternate procedure, we may use flat plates acting upon a stationary sheet, corresponding to the traveling web 7, and a stationary layer of plastic, corresponding to the moving layer 1.

We claim:

1. The hereindescribed method which comprises: printing a predetermined design upon one side of a transfer sheet, thereafter bringing the thus printed side of the sheet into facial contact with a layer of organic plastic, bringing an embossing device into registration with at least part of said printed design and forcing that part of the printed design against the plastic layer to emboss that part of the printed design and layer with different parts of the printed design in different relief, and thereafter stripping said sheet from the plastic layer, the printed design on said sheet comprising printed material having bonding affinity with the plastic layer, whereby the printed design remains on the plastic layer when the transfer sheet is stripped therefrom.

2. The herein described method which comprises: printing a predetermined design upon a traveling transfer web, thereafter bringing the thus printed side of the web into facial contact with a moving organic plastic layer, bringing an embossing device into registration with at least part of the printed design and forcing that part of the printed design against the plastic layer to emboss that part of the printed design and layer with different parts of the printed design in different relief, and thereafter stripping the transfer web from said layer, the printed design on the web comprising printing material having bonding affinity with the plastic layer, whereby the printed design remains on the plastic layer when the transfer web is stripped therefrom.

3. The herein described method which comprises: printing a predetermined design upon one side of a transfer sheet, thereafter bringing the thus printed side of the sheet into facial contact with a layer of organic plastic, bringing an embossing device into registration with at least part of said printed design and forcing that part of the printed design against the plastic layer to emboss that part of the printed design and layer with different parts of the printed design in different relief, thereafter stripping said sheet from the plastic layer, the printed design on said sheet comprising printing material having bonding affinity with the plastic layer, whereby the printed design remains on the plastic layer when the transfer sheet is stripped therefrom, and thereafter applying to the printed embossed surface of the plastic layer a protective covering.

4. The herein described method which comprises: printing a predetermined design upon a traveling transfer web, thereafter bringing the thus printed side of the web into facial contact with a moving organic plastic layer, bringing an embossing device into registration with at least part of the printed design and forcing that part of the printed design against the plastic layer to emboss that part of the printed design and layer with different parts of the printed design in different relief, thereafter stripping the transfer web from said layer, the printed design on the web comprising printing material having bonding affinity with the plastic layer, whereby the printed design remains on the plastic layer when the transfer web is stripped therefrom, and thereafter applying to the printed embossed surface of the plastic layer a protective covering.

EDWARD KARFIOL.
WILLIAM A. ROEHM.